(12) United States Patent
Gambardella et al.

(10) Patent No.: US 8,141,219 B2
(45) Date of Patent: Mar. 27, 2012

(54) TOOL FOR ASSISTING IN CUTTING THE CONDUCTORS OF AN ELECTRICAL CABLE TO A PRECISE LENGTH

(75) Inventors: Eddie Gambardella, Blagnac (FR); Daniel Feral, Merville (FR); Gilles Andre, Fonsorbes (FR)

(73) Assignee: Airbus Operations SAS, Toulouse (FR)

( * ) Notice: Subject to any disclaimer, the term of this patent is extended or adjusted under 35 U.S.C. 154(b) by 1193 days.

(21) Appl. No.: 11/575,989

(22) PCT Filed: Sep. 14, 2005

(86) PCT No.: PCT/FR2005/002273
§ 371 (c)(1),
(2), (4) Date: Mar. 26, 2007

(87) PCT Pub. No.: WO2006/035130
PCT Pub. Date: Apr. 6, 2006

(65) Prior Publication Data
US 2008/0034574 A1    Feb. 14, 2008

(30) Foreign Application Priority Data
Sep. 27, 2004    (FR) .................................. 04 10179

(51) Int. Cl.
*B23P 19/00*    (2006.01)
(52) U.S. Cl. ....... 29/239; 29/271; 29/270; 254/134.3 FT
(58) Field of Classification Search .................. 29/239, 29/238, 255, 270, 280, 271; 254/134.3 FT, 254/134.3 R
See application file for complete search history.

(56) References Cited

U.S. PATENT DOCUMENTS

| 903,818 | A | * | 11/1908 | Herth .......................... 24/134 P |
|---|---|---|---|---|
| 1,374,278 | A | | 4/1921 | Burch |
| 1,491,022 | A | | 4/1924 | Arbon |
| 3,110,093 | A | * | 11/1963 | Johnson ......................... 29/747 |
| 3,872,806 | A | * | 3/1975 | Bone ............................. 112/104 |
| 4,132,665 | A | * | 1/1979 | Nelson ................... 254/134.3 R |
| 4,731,928 | A | | 3/1988 | Jackson et al. |
| 4,796,865 | A | * | 1/1989 | Marchetti ............ 254/134.3 FT |
| 4,914,986 | A | | 4/1990 | Masaki et al. |
| 5,639,993 | A | * | 6/1997 | Ideno et al. ............... 174/153 G |
| D401,907 | S | * | 12/1998 | Gazerro ....................... D13/155 |
| 7,484,711 | B2 | * | 2/2009 | Pyron .................. 254/134.3 FT |
| 2004/0185704 | A1 | | 9/2004 | Perkins |
| 2008/0034574 | A1 | * | 2/2008 | Gambardella et al. ....... 29/566.4 |

FOREIGN PATENT DOCUMENTS
FR    2432233    2/1980

OTHER PUBLICATIONS

PCT International Search Report dated Mar. 6, 2006.
Patent Abstracts of Japan, vol. 1998, No. 11, Sep. 30, 1998 & JP 10 172708 A (Matsushita Electric Ind. Co., Ltd.), Jun. 26, 1998, abstract.
Patent Abstracts of Japan, vol. 2002, No. 09, Sep. 4, 2002 & JP 2002 151195 A (Tri Saitama: KK), May 24, 2002, abstract.

\* cited by examiner

*Primary Examiner* — Lee D Wilson
(74) *Attorney, Agent, or Firm* — Dickinson Wright PLLC

(57) ABSTRACT

A tool for assisting in cutting the conductors of an electrical cable to a precise length includes a body, the body being pierced with a channel which is orthogonal to a reference face and which is equipped with a shoulder. The distance between the shoulder and the reference face is equal to the desired length of the end portions of the conductors of the electrical cable outside the outer insulating sheath thereof.

4 Claims, 1 Drawing Sheet

TOOL FOR ASSISTING IN CUTTING THE CONDUCTORS OF AN ELECTRICAL CABLE TO A PRECISE LENGTH

The present invention relates to a tool intended for assisting an operator or a machine in cutting to a precise length the conductors of an electrical cable comprising a plurality of such conductors.

It is known that certain electrical techniques, such as information technology techniques, for example, require the length of the electrical conductors projecting from the outer insulating sheath of a cable to be very precise and, at any event, to be more precise than that which can be obtained using a ruler.

The subject of the present invention is a tool making it possible to achieve a high degree of precision in the projecting length of these conductors.

To this end, according to the invention, the tool intended for assisting in cutting to length conductors of an electrical cable comprising a plurality of such conductors encased in an insulating sheath, at least one end of said cable being prepared such that the end portions of said conductors project from the corresponding end of said insulating sheath, said tool making it possible to adjust, to a predetermined precise length, said projecting end portions of said conductors, is noteworthy for the fact that:

it comprises a body having a reference face and a channel which is orthogonal to said reference face;

said channel comprises a first part of larger cross section and a second part of smaller cross section, which are separated by a shoulder;

said first part of the channel is able to accommodate with slight friction said electrical cable such that said end of the insulating sheath comes into butting contact with said shoulder;

said second part of the channel is able to accommodate with slight friction the whole of said projecting end portions of said conductors and, on the opposite side to said shoulder, opens into said reference face;

the distance separating said shoulder from said reference face is equal to said predetermined precise length.

It is thus possible by using a cutting tool suitable for cutting off, along said reference face, the ends of said conductors projecting from this reference face to give said conductors said precise predetermined length with respect to the end of said insulating sheath.

In order to facilitate the passage of said end portions of the conductors between said first and second parts of the channel, said shoulder is preferably shaped as a funnel.

In the usual case of an electrical cable whereof the end of the insulating sheath is retained by a collar (the external end thus acting as the end of the insulating sheath), the end portions of said conductors then projecting from said collar, said first part of the channel is able to accommodate with slight friction said electrical cable equipped with said collar such that said collar comes into butting contact with said shoulder.

In the likewise usual case in which the cable comprises a metal shielding sheath between said insulating sheath and said conductors, said first channel part is able—whether or not the end of the sheath is retained by a collar—to accommodate with slight friction said electrical cable together with said metal shielding sheath, which is turned back externally over said insulating sheath.

The figures of the appended drawing will give a clear understanding of how the invention can be implemented. Identical references are used in these figures to denote like elements.

Figures 2, 3:
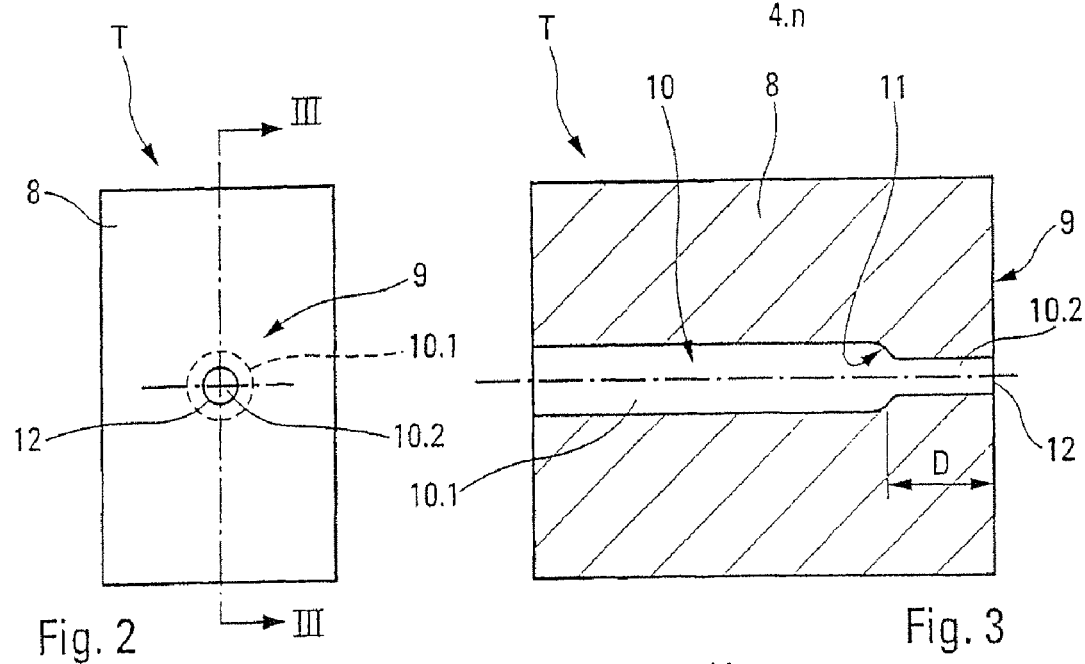
FIG. 2 is a view, from the reference face, of the tool according to the present invention.
FIG. 3 is a section of said tool taken along line III-III of FIG. 2.
Figure 4:
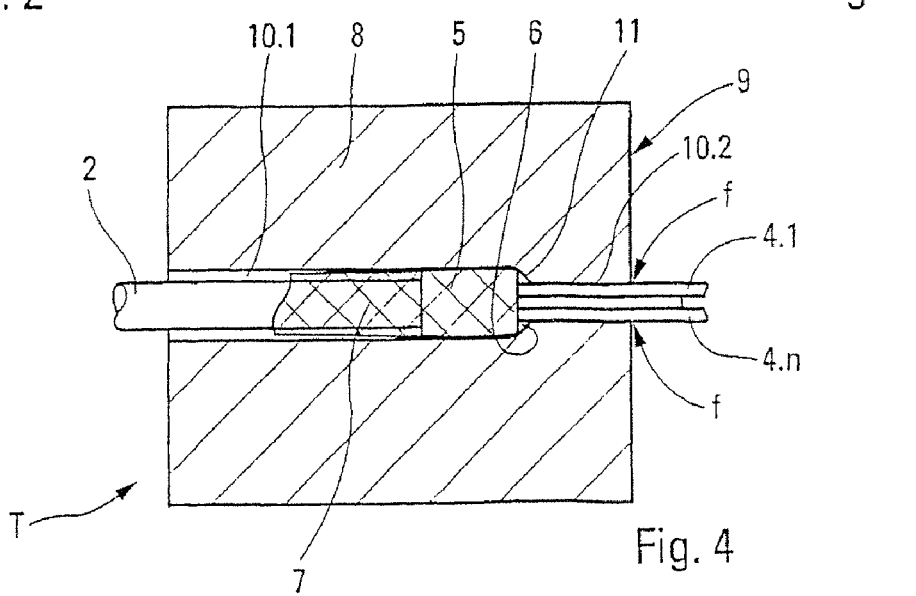

FIG. 4 schematically illustrates the use of the tool of FIGS. 2 and 3.

Figure 1:
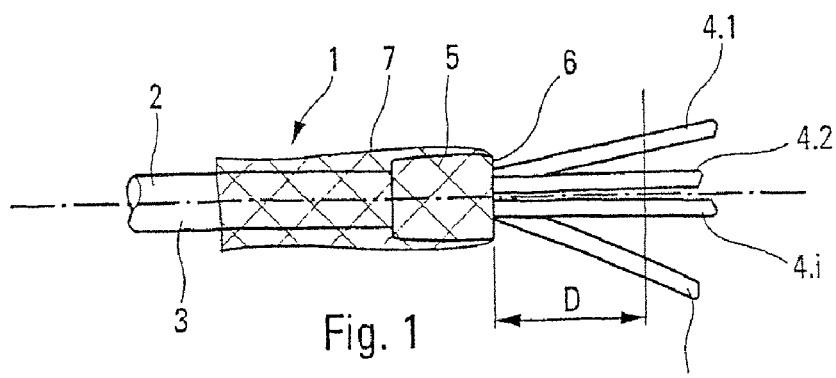
FIG. 1 is a schematic view illustrating the end of an electrical cable, this end having been prepared with a view to being introduced into the tool according to the present invention.

The end 1, represented in FIG. 1, of the electrical cable 2 comprises an external insulating sheath 3 enclosing a plurality of n conductors whose end portions $4.1, 4.2, \ldots, 4i, \ldots, 4.n$ (n and i being whole numbers where i<n) project from said sheath 3 and are, for example, jacketed in their own insulating sheaths.

The end of the external insulating sheath 3 is clamped in a collar 5 tightly surrounding said cable 2 and, starting from the external end 6 of said collar 5, the projecting end portions of the conductors 4.1 to 4.n have a length which is greater than a precise and predetermined value D desired for said end portions 4.1 to 4.n.

Furthermore, the electrical cable 2 comprises, between the conductors and the external insulating sheath 3, a metal shielding sheath 7 which emerges from the collar 5 at the end 6 thereof and which is turned back over said collar 5 and over said external sheath 3.

FIGS. 2 and 3 show the tool T according to the present invention that provides cutting assistance.

The tool T comprises a parallelepipedal body 8 having a reference face 9. A channel 10, orthogonal to said reference face 9, is bored in the body 8. The channel 10 comprises, away from the reference face 9, a first, larger-diameter part 10.1 and, toward the reference face 9, a second, smaller-diameter part 10.2, said parts 10.1 and 10.2 being connected to one another by a shoulder 11, which is shaped as a funnel from the part 10.1 toward the part 10.2.

The part 10.2 opens into the reference face 9 by way of an orifice 12 and the distance separating the shoulder 11 from said reference face 9 is equal to the desired distance D.

The cross section of the part 10.1 of the channel 10 is able to accommodate with slight friction the cable 2, together with its collar 5 and the metal shielding sheath 7, which is turned back over this collar and over said cable.

The cross section of the part 10.2 of the channel 10 is able to accommodate with slight friction the whole of the end portions 4.1 to 4.n of the conductors of the cable 2.

As illustrated in FIG. 4, the cable 2 is introduced into the channel part 10.1, through the opposite end thereof to the shoulder 11, by way of the end portions 4.1 to 4.n and by way of the collar 5 covered with the shielding sheath 7. The cable 2 is pushed toward the reference face 9 so that the end portions 4.1 to 4.n pass from the channel part 10.1 to the channel part 10.2 across the shoulder 11, and pushing is continued until the end 6 of the collar 5 comes into bearing contact with the shoulder 11. The end portions 4.1 to 4.n then project outside the reference face, through the orifice 12.

Following the cutting operation, as is suggested by the arrows f.f of FIG. 4, in which the excess lengths of the end portions 4.1 to 4.n projecting from said reference face 9 have been cut off along this reference face (for example using cutting pliers having flat jaws), said end portions 4.1 to 4.n all have the desired length D.

Following such a cutting procedure, the cable 2 is withdrawn from the tool T and the end portions 4.1 to 4.2 are prepared (stripped) with a view to their subsequent connection.

The invention claimed is:

1. A tool configured for assisting in cutting to length conductors of an electrical cable comprising a plurality of such conductors encased in an insulating sheath, at least one end of said electrical cable being prepared such that end portions of said conductors project from a corresponding end of said insulating sheath, said tool configured to adjust, to a predetermined precise length, said projecting end portions of said conductors, wherein:

the tool comprises a solid body having a reference face and a channel which is orthogonal to said reference face;

said channel comprises a first part having a larger and longer cross section and a second part having a smaller and shorter cross section, which are separated by a shoulder;

said first part of the channel is configured to accommodate with slight friction said electrical cable such that said corresponding end of the insulating sheath comes into butting contact with said shoulder;

said second part of the channel is configured to accommodate with the slight friction the whole of said projecting end portions of said conductors and, on the opposite side to said shoulder, opens into said reference face; and a distance separating said shoulder from said reference face is equal to said predetermined precise length, wherein the reference face comprises a cutting reference face configured to guide a cutting tool along a surface of the cutting reference face to enable the cutting tool to cut off excess lengths of said projecting end portions of said conductors to adjust said projecting end portions to said predetermined precise length.

2. The tool as claimed in claim 1, wherein said shoulder is shaped as a funnel which facilitates passage of the whole of said projecting end portions of said conductors from said first part to said second part of said channel.

3. The tool as claimed in claim 1, wherein said electrical cable comprises a collar, and said first part of the channel is further configured to accommodate with the slight friction said electrical cable comprising the collar to retain said corresponding end of the insulating sheath and having the projecting end portions of said conductors projecting from said collar, such that said collar comes into the butting contact with said shoulder.

4. The tool as claimed in claim 1, wherein the electrical cable comprises a metal shielding sheath between said insulating sheath and said conductors, and said first part of the channel part is further configured to accommodate with the slight friction said electrical cable comprising the metal shielding sheath, said metal shielding sheath being turned back externally over said insulating sheath.

* * * * *